H. Bendix & J. H. Fleisch.
Neck-Tie.

No. 2943. Reissued May 26. 1868

Witnesses

[illegible]

Wm. Trewin

Inventors

H. Bendix.

J. H. Fleisch.

per Munn & Co

Attorneys.

UNITED STATES PATENT OFFICE.

HERMAN BENDIX, OF NEW YORK, N. Y., ASSIGNEE OF H. BENDIX AND J. H. FLEISCH, OF SAME PLACE.

IMPROVEMENT IN NECKTIES.

Specification forming part of Letters Patent No. 53,102, dated March 13, 1866; Reissue No. 2,943, dated May 26, 1868.

*To all whom it may concern:*

Be it known that H. BENDIX and J. H. FLEISCH, of the city, county, and State of New York, have invented a new and Improved Scarf-Hook or Necktie-Holder; and I, H. BENDIX, assignee of said BENDIX and FLEISCH, do hereby declare the following to be a full, clear, and exact description thereof, which will enable those skilled in the art to make and use the same, reference being had to the accompanying drawings, forming part of this specification, in which drawings—

Figure 1:
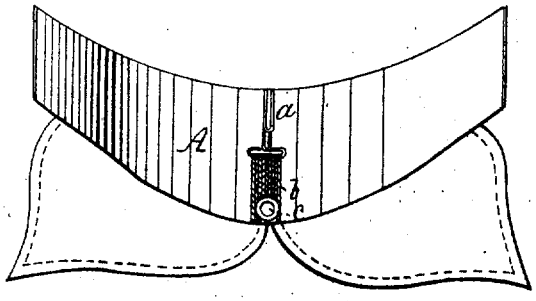
Figure 2:
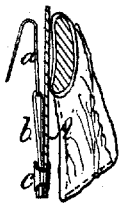

Figure 1 represents an inside view of this invention. Fig. 2 is a transverse vertical section of the same.

Similar letters indicate corresponding parts.

This invention consists of a necktie-holder composed of a hook, which catches over the neckband of the shirt, and which is attached to an elastic band that connects with an eyelet, rivet, clasp, or other fastening capable of securing said band and hook to the supporting plate or frame of a butterfly or necktie in such a manner that by making the hook to catch over the neckband of the shirt a safe and convenient device for supporting the necktie is obtained.

The letter *a* represents the hook of this necktie-holder, said hook being made of metal wire or any other suitable material, and secured to an elastic band or tape, *b*, as shown. This tape is also connected to an eyelet, rivet, clasp, or other suitable fastening device, *c*, capable of being readily attached to the supporting plate or frame A of a scarf, butterfly, or necktie. After the hook *a*, with its band *b* has been attached to the supporting-plate H, the hook is passed over the neckband of the shirt, and the necktie is firmly and safely sustained in position. The attachment of this hook is not made dependent upon the shirt-button. It simply serves to suspend the necktie from the edge of the neck-band, and by these means a necktie-holder is obtained which can be readily and conveniently handled.

What I claim as new, as the invention of H. BENDIX and J. H. FLEISCH, and desire to secure by Letters Patent, is—

A fastening device for neckties, consisting of a hook, *a*, elastically secured to its holder or retainer, substantially as described.

HERMAN BENDIX.

Witnesses:
W. HAUFF,
E. F. KASTENHUBER.